(12) United States Patent
Wang et al.

(10) Patent No.: US 11,960,450 B2
(45) Date of Patent: Apr. 16, 2024

(54) ENHANCING EFFICIENCY OF SEGMENT CLEANING FOR A LOG-STRUCTURED FILE SYSTEM

(71) Applicant: VMware LLC, Palo Alto, CA (US)

(72) Inventors: Wenguang Wang, Santa Clara, CA (US); Ilia Langouev, Santa Cruz, CA (US); Vamsi Gunturu, Cupertino, CA (US); Junlong Gao, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/999,994

(22) Filed: Aug. 21, 2020

(65) Prior Publication Data
US 2022/0058161 A1    Feb. 24, 2022

(51) Int. Cl.
G06F 16/174 (2019.01)
G06F 9/455 (2018.01)
G06F 16/11 (2019.01)
G06F 16/188 (2019.01)

(52) U.S. Cl.
CPC ...... *G06F 16/1752* (2019.01); *G06F 9/45558* (2013.01); *G06F 16/116* (2019.01); *G06F 16/188* (2019.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 2017/0351608 A1* | 12/2017 | Shirakawa | ............ | G06F 3/0641 |
| 2020/0293499 A1* | 9/2020 | Kohli | ............ | G06F 3/0604 |
| 2021/0019237 A1* | 1/2021 | Karr | ............ | G06F 3/0683 |
| 2021/0055966 A1* | 2/2021 | Della Monica | ............ | G06F 3/0608 |
| 2021/0103564 A1* | 4/2021 | Fretz | ............ | G06F 16/9014 |

OTHER PUBLICATIONS

Antony Rowstron; Storage management and caching in PAST, a large-scale, persistent peer-to-peer storage utility; 2001; ACM; pp. 188-201 (Year: 2001).*

Sheng Qiu; NVMFS: A Hybrid File System for Improving Random Write in NAND-flash SSD; IEEE; 2013; pp. 1-5 (Year: 2013).*

* cited by examiner

*Primary Examiner* — Albert M Phillips, III
*Assistant Examiner* — Jermaine A Mincey
(74) *Attorney, Agent, or Firm* — King Intellectual Asset Management

(57) ABSTRACT

The efficiency of segment cleaning for a log-structured file system (LFS) is enhanced at least by storing additional information in a segment usage table (SUT). Live blocks (representing portions of stored objects) in an LFS are determined based at least on the SUT. Chunk identifiers associated with the live blocks are read. The live blocks are coalesced at least by writing at least a portion of the live blocks into at least one new segment. A blind update of at least a portion of the chunk identifiers in a chunk map is performed to indicate the new segment. The blind update includes writing to the chunk map without reading from the chunk map. In some examples, the objects comprise virtual machine disks (VMDKs) and the SUT changes between a list format and a bitmap format, to minimize size.

20 Claims, 8 Drawing Sheets

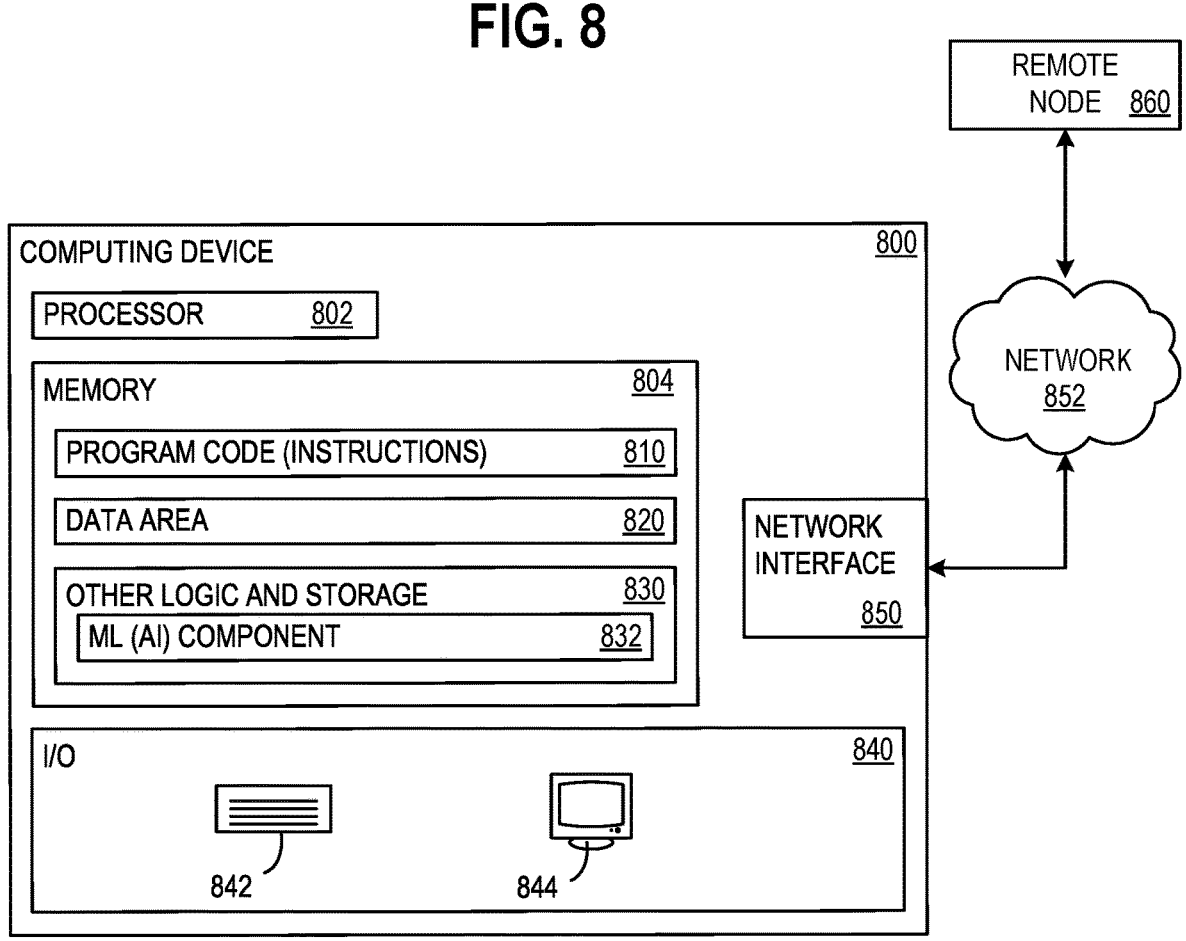

ENHANCING EFFICIENCY OF SEGMENT CLEANING FOR A LOG-STRUCTURED FILE SYSTEM

BACKGROUND

Storage of large amounts of data, for example for backups and disaster recovery of large-scale systems, benefits from efficient solutions that are based on a trade-off of access time, resource utilization, and financial costs. In some scenarios, a log-structured file system (LFS) provides desirable properties. An LFS uses segment cleaning to reclaim storage space, moving remnants of partially-deleted data from multiple lightly-used contiguous sections (e.g., log segments) into a smaller set of more heavily-used log segments. This provides the opportunity to write new data as full segments, which reduces the negative impact of a phenomenon known as write amplification—an expansion of the input/output (I/O) transactions that are caused, at least in part, by error control measures.

An LFS requires segment cleaning (garbage collection), typically leveraging a segment usage table (SUT) to indicate which blocks of data in the LFS are live (e.g., holding current data), so that blocks holding obsolete data (e.g., data that has been marked for deletion) may be overwritten. In some configurations, data is stored in chunks, to facilitate deduplication and speed network communication (e.g., by eliminating the need to transmit a duplicate chunk). In such configurations, a chunk map (chunk table) may point to current chunks, which indicates live data. However, when the chunk map is stored in a log-structured merge-tree (LSM-tree), which is a write-optimized structure, reading the chunk map is slow and may become a bottleneck in the segment cleaning process, if the chunk map must be read in order to be updated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure enhance the efficiency of segment cleaning for a log-structured file system (LFS) at least by determining, based at least on a segment usage table (SUT), live blocks in an LFS, wherein the live blocks represent portions of stored objects; reading the live blocks, wherein reading the live blocks includes reading chunk identifiers (chunkIDs) associated with the live blocks; coalescing the live blocks, wherein the coalescing comprises writing at least a portion of the live blocks into at least one new segment; performing a blind update of at least a portion of the chunkIDs in a chunk map to indicate the new segment, wherein performing a blind update comprises writing to the chunk map without reading from the chunk map.

BRIEF DESCRIPTION OF THE DRAWINGS

The present description will be better understood from the following detailed description read in the light of the accompanying drawings, wherein:

FIG. 8 illustrates a block diagram of a computing device that may be used as a component of the architecture of FIG. 1, according to an example.

DETAILED DESCRIPTION

Aspects of the disclosure enhance the efficiency of segment cleaning for a log-structured file system (LFS). Live blocks (representing portions of stored objects) in an LFS are determined based at least on a segment usage table (SUT). The live blocks are read by reading chunk identifiers (chunkIDs) associated with the live blocks. The live blocks are coalesced at least by writing at least a portion of the live blocks into at least one new segment. A blind update of at least a portion of the chunkIDs in a chunk map is performed to indicate the new segment. The blind update comprises writing to the chunk map without reading from the chunk map. In some examples, the objects comprise virtual machine disks (VMDKs) and the SUT changes between a list format and a bitmap format, to minimize size.

Aspects of the disclosure operate in an unconventional manner at least by performing a blind update of chunkIDs in a chunk map, wherein performing the blind update comprises writing to the chunk map without reading from the chunk map, thereby advantageously improving the speed efficiency, and cost of computer storage (e.g., speeding data writing and/or reading). Aspects of the disclosure further improve the speed, efficiency, and cost of computer storage by, based at least on a change of size of the SUT, changing a format of the SUT between a list format and a bitmap format. That is, for smaller amounts of stored data, the list format is more efficient, whereas for larger amounts of stored data, the bitmap format is more efficient. Advantageous teachings of the disclosure may be applied in backup and disaster recovery solutions for software defined data centers (SDDCs) and other environments in which a chunk map is used with an LFS.

Figure 1:
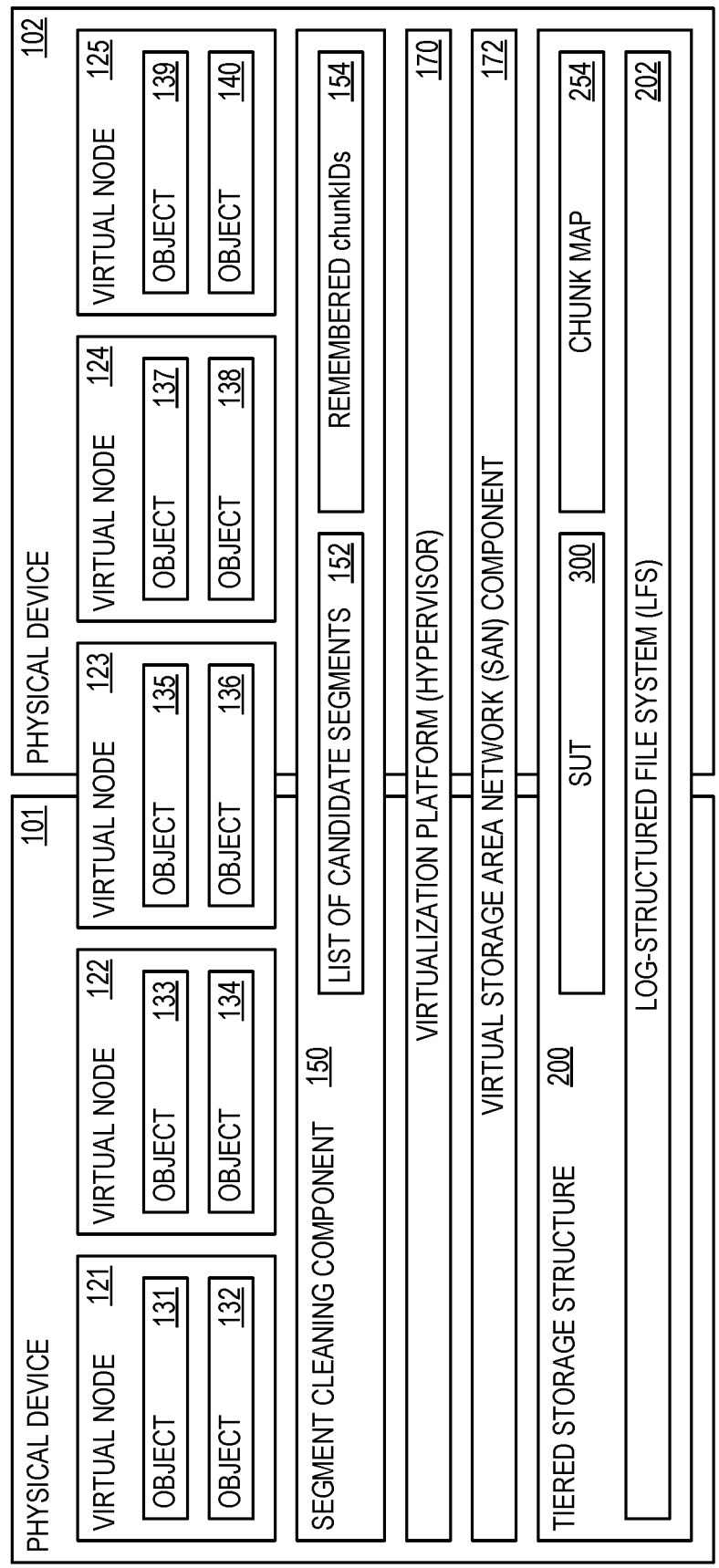
FIG. 1 illustrates an architecture that may advantageously enhance efficiency of segment cleaning for a log-structured file system (LFS)

FIG. 1 illustrates an architecture 100 that may advantageously enhance efficiency of segment cleaning for an LFS. A plurality of physical devices, represented as physical device 101 and physical device 102, provides the underlying hardware for a virtualized arrangement, such as an SDDC. A virtualization platform 170, which includes hypervisor functionality, manages objects 131-140. In some examples, objects 131-140 represent VMDKs, for example snapshots of VMDKs. In some examples, objects 131-140 are snapshots of versioned object data, for example VMDK snapshots. In some examples, each snapshot is a version of a versioned object. A virtual storage area network (SAN) component 172 permits use of separate physical storage devices (e.g., physical devices 101 and 102 or some other set of physical devices) to be treated as a single storage solution.

Virtual SAN component 172 writes to and reads from a tiered storage structure 200 (a tiered data storage structure) that includes an LFS 202, a SUT 300, and a chunk map 254. Tiered storage structure 200, LFS 202, and chunk map 254 are described in further detail in relation to FIG. 2. SUT 300 is described in further detail in relation to FIGS. 3A and 3B. Storage of data in chunks is described in further detail in relation to FIG. 5. As illustrated, virtualization platform 170, virtual SAN component 172, tiered storage structure 200, and LFS 202 span multiple physical devices 101-102. Objects 131-140 are associated with various ones of virtual nodes 121-125.

A segment cleaning component 150 performs segment cleaning of LFS 202, by leveraging SUT 300. SUT 300 (either the version of FIG. 3A or the version of FIG. 3B) indicates the amount of space used or available in each log segment and may be used to ascertain which log segments are suitable candidates for segment cleaning. Candidates for segment cleaning are indicated in a list of candidate segments 152. Because segment cleaning moves data within LFS 202, and object data is stored as chunks, chunk map 254 will require updating as a result of a segment cleaning operation.

However, because chunk map 254 is stored in a log-structured merge-tree (LSM-tree) 256 (see FIG. 2), which is a write-optimized structure, reading chunk map 254 (in order to update it) may slow the segment cleaning process. Therefore, as described herein, segment cleaning component 150 avoids reading chunk map 254, and instead performs a blind update of chunk map 254. That is, segment cleaning component 150 writes updated information, regarding the coalesced data, without needing to first read from chunk map 254. Segment cleaning component 150 is able to accomplish this by extracting chunkIDs from LFS 202 (rather than from chunk map 254), holding these in a set of remembered chunkIDs 154, and using remembered chunkIDs 154 to identify where in chunk map 254 to write the updated data (e.g., new chunk locations).

Although a single segment cleaning component 150 is illustrated, it should be understood that some examples may use a plurality of individual segment cleaners, each assigned to different ones of virtual nodes 121-125 and objects 131-140. It should be further understood that, although five virtual nodes 121-125 and ten objects 131-140 are illustrated, in some examples, the numbers may be closer to hundreds of virtual nodes, and thousands or even millions of objects.

Figure 2:
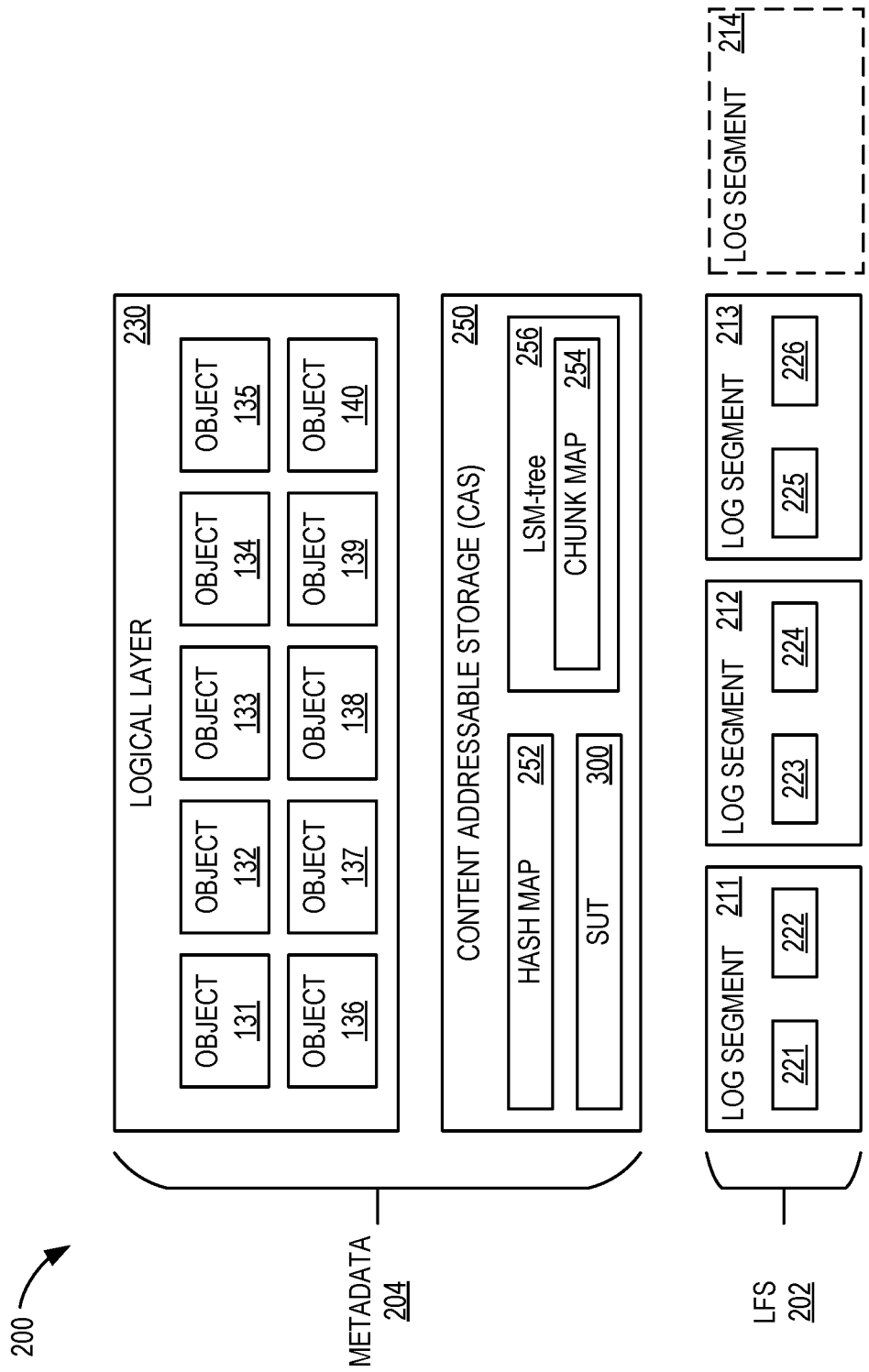
FIG. 2 illustrates a tiered data storage structure (including an LFS) that may be used in the architecture of FIG. 1.
Figure 5:
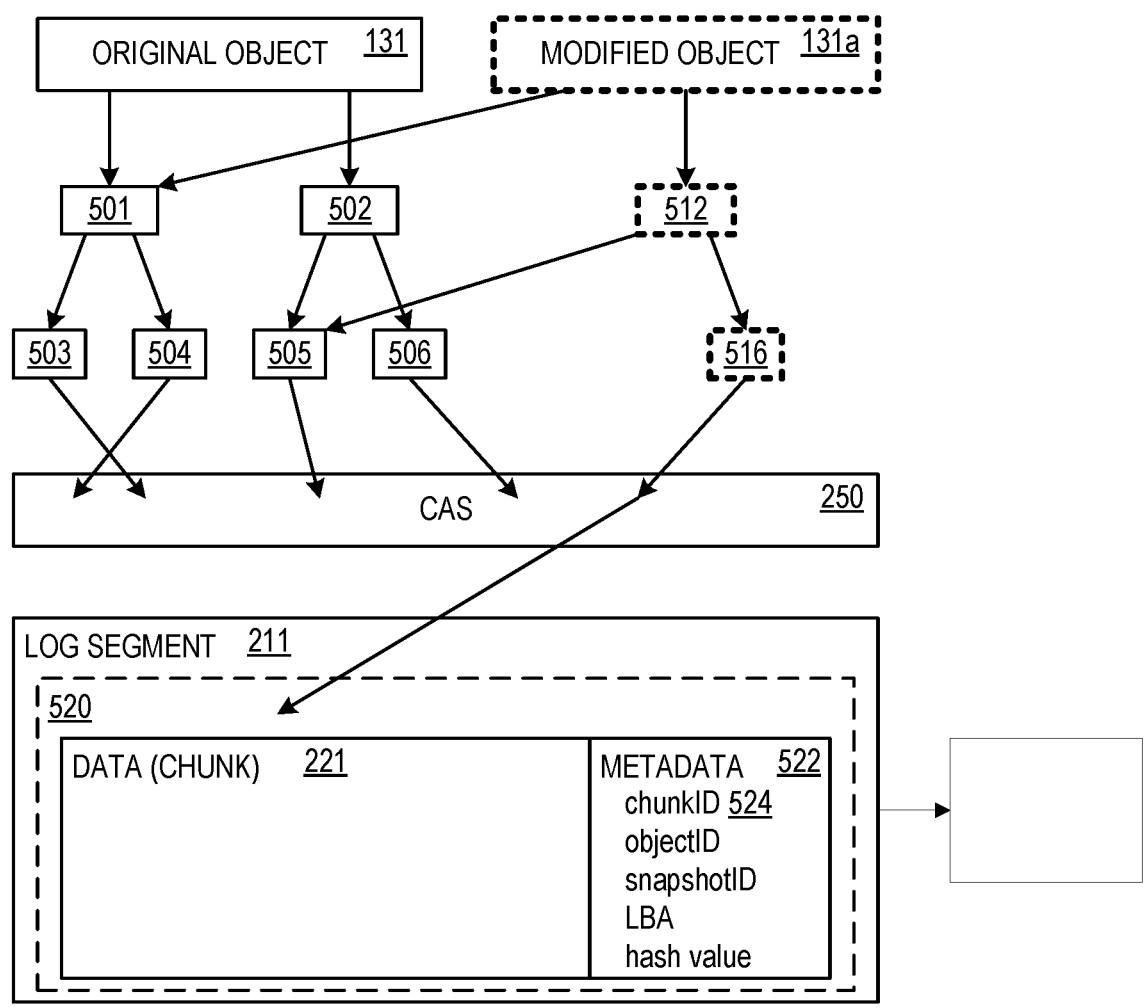
FIG. 5 illustrates an exemplary data format that may be used to store chunks in the tiered data storage structure of FIG. 2.

FIG. 2 illustrates tiered storage structure 200 that may be used in architecture 100. Tiered storage structure 200 has LFS 202 and a metadata tier 204. LFS 202 includes multiple log segments 211-213 that actually store the bulk data as chunks. In some examples, log segments 211-213 are each approximately 4 megabytes (MB), for example 4 MB of data followed by metadata describing the data contents, when on primary (faster) storage, but 40 MB when stored on long-term (slower) storage. As shown, log segment 211 has chunk 221 and chunk 222; log segment 212 has chunk 223 and chunk 224; and log segment 213 has chunk 225 and chunk 226. Log segment 214 will be the next segment to which data is written, either new incoming data, or live blocks in a coalescing operation that are being written to a new segment. The number of chunks actually within a log segment may depend on the chunk size and the log segment size. Log segments comprise blocks, and a block comprises a chunk and its associated metadata. Further detail regarding a representative one of chunks 221-226 is illustrated in FIG. 5. It should be understood that the illustration of only three log segments and eight chunks is notional and a much larger number of log segments and chunks may be used.

Metadata tier 204 has a top logical layer 230 that represents objects, such as objects 131-140, and a content addressable storage (CAS) 250 that assists mapping contents of logical layer 230 to LFS 202. CAS 250 holds a hash map 252, chunk map 254 stored as key-value pairs in LSM-tree 256, and SUT 300. In some examples, hash map 252 and SUT 300 are also stored in an LSM-tree. LSM-tree 256 comprises a write-optimized data structure that maintains multiple levels of larger sorted tables, for example 300 MB, 3 gigabytes (GB), 30 GB, and 300 GB as an exponential four-level LSM-tree. LSM-tree 256 may be structured to minimize write amplification for random updates, and each level may be a log.

CAS 250 sitting between logical layer 230 and LFS 202 (a data tier) serves multiple purposes simultaneously. This arrangement permits deduplication operations to locate data by content, and adds a level of indirection to allow LFS 202 to move data efficiently during segment cleaning. A hash function (e.g., secure hash algorithm 256 (SHA-256)) may be used as the content hash so that any blocks with identical hash values stored in hash map 252 may be identified as duplicates. This also enables CAS 250 to locate any block in LFS 202 when provided its hash value, facilitating data deduplication. Data deduplication may be performed inline and/or offline. Inline deduplication performs deduplication on the write path directly so that less data is written initially, thereby implementing network acceleration.

In some examples, deduplication workflow includes searching hash map 252 to determine whether a block is a duplicate and if so, permitting logical layer 230 to point to the duplicate block's chunkID directly, and increasing that chunkID's reference count. In order to utilize the locality of the chunkID and reduce memory usage, an approximate cache using a quotient filter and a regular hash using a cuckoo hash as the cache may be used. In some examples, if each virtual node (e.g., virtual nodes 121-125) is able to manage 3,000 objects (e.g., objects 131-140) of 100 GB each, 1 GB is used to cache the hash value and chunkID pairs which represent 3 terabytes (TB) worth of data. In some examples, for each new group of 32 chunks, which forms a run of 128 kilobytes (KB), the regular cache is searched for a duplicate first, and on cache misses, the approximate cache is searched. If a duplicate is found in the approximate cache, the corresponding chunkID, and the following 31 chunkIDs, are loaded into the regular cache. This allows unique blocks to quickly fail without generating disk input/output (I/O) transactions, while allowing the regular cache to absorb most duplicated data.

Because hash values are randomly distributed, CAS 250 also includes chunk map 254 to improve caching. Chunk map 254 maps chunk identifiers (chunkIDs) to the chunks' locations in LFS 202. In some examples, chunkIDs in chunk map 254 are sequentially allocated for locality, thereby facilitating blind writing. In some examples, a chunk identifier may be 8 bytes. In some examples, each chunk is 4 kilobytes (KB) so that block differences are 4 KB aligned. A chunk (or an array of chunks) is a deduplication unit, allowing multiple objects to point to common chunks to save space. In some examples, chunk map 254 maps a chunkID to a log segment, via a segment identifier (segmentID), and also an offset and a size. For example, <chunkID>→<segmentID, offset, size>. In some examples, a segmentID includes a timestamp.

Figure 3A:
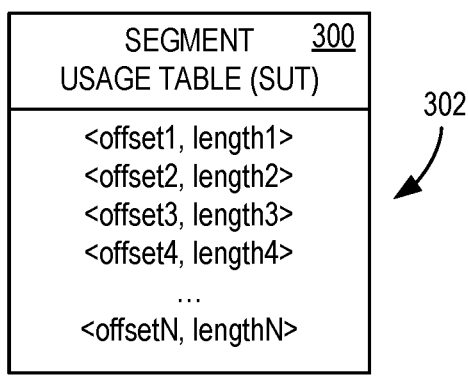
FIGS. 3A and 3B illustrate different formats for a segment usage table (SUT) that may be used in the architecture of FIG. 1.
Figure 3B:
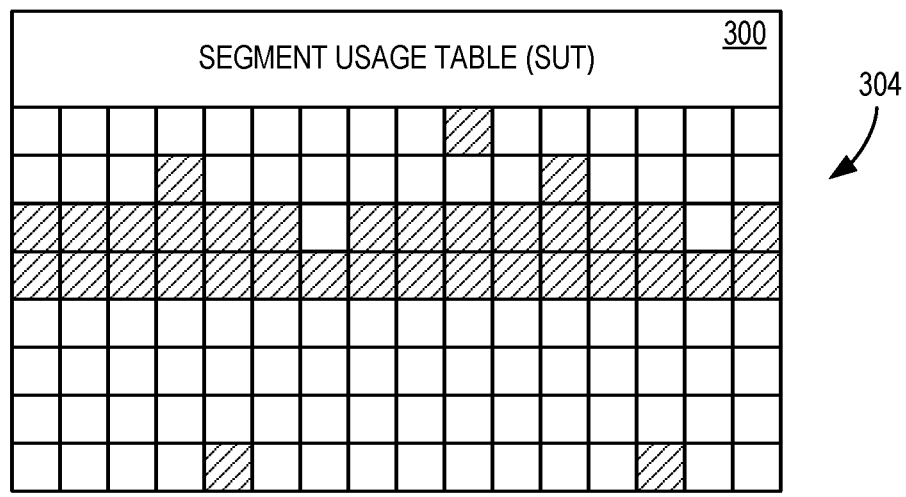

LFS 202 is managed, in part, by SUT 300, which is illustrated in different formats in FIGS. 3A and 3B. FIG. 3A illustrates a list format for SUT 300, and a bitmap format is illustrated in FIG. 3B. The list format illustrated in FIG. 3A may be used, for example, when the amount of data being stored is sufficiently small and the size of SUT 300 scales linearly with the amount of data being stored. The bitmap format shown in FIG. 3B may be used, for example, when the amount of data being stored is large and the size of SUT 300 remains constant, independent of the amount of data being stored.

SUT 300 (in either format) assists with segment cleaning by indicating which log segments of LFS 202 are heavily used and which log segments are lightly used. Lightly used log segments are suitable candidates for segment cleaning, and may be indicated in list of candidate segments 152. After log segments are selected as cleaning candidates, they are read into memory as live blocks and are rewritten to the end of LFS 202. Chunk map 254 in CAS 250 is adjusted to point to the new log segments and the old log segments may be over-written. Removal may be logical, such as dereferencing the log segments.

As writing to LFS 202 progresses, the current log segment (to which the next incoming data will be written) circles around back to the top of SUT 300. Segment cleaning operations prepare for this by cleaning out lightly used log segments and coalescing their blocks into full or more heavily-used log segments. Because segment cleaning moves data within LFS 202, and data is stored as chunks, chunk map 254 will require updating as a result of a segment cleaning operation.

Referring now specifically to FIG. 3A, SUT 300 has a list 302 in its list format form. For each contiguous run of live blocks, list 302 identifies offsets, corresponding to locations in LFS 202 and identified as offset1, offset2 . . . offsetN, and the corresponding length of the continuous run of live blocks, identified as length1, length2 . . . lengthN. In some examples, the offset fields are 13 bits each, to permit addressing of blocks (with each block holding a 4 KB chunk followed by 512 bytes for the metadata) up through the end of an approximately 4 MB segment. In some examples, the length fields are 11 bits each, which precludes list 302 identifying a full LFS 202 with a single list entry pair (e.g., an offset of zero and the length being the entire length of LFS 202). Rather, for this case, which will likely not occur, SUT 300 would require four entries in list 302, which is still quite compact.

Figure 4:
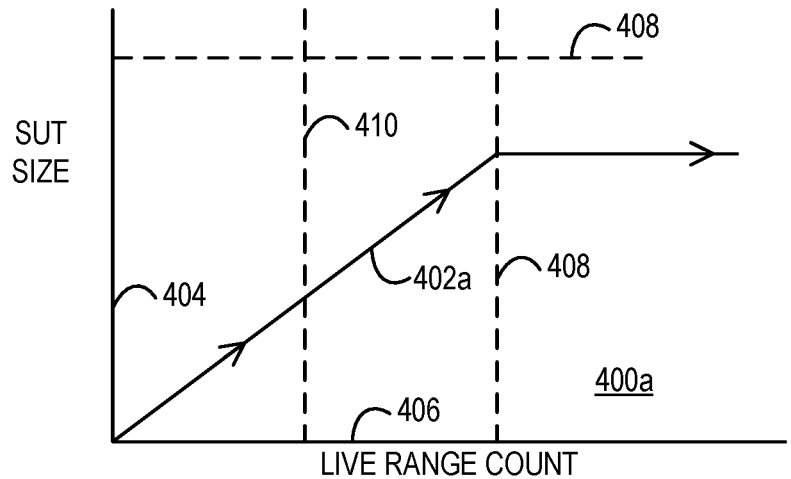
FIG. 4 illustrates a hysteresis condition for changing between the SUT formats of FIGS. 3A and 3B.
Figure 4:
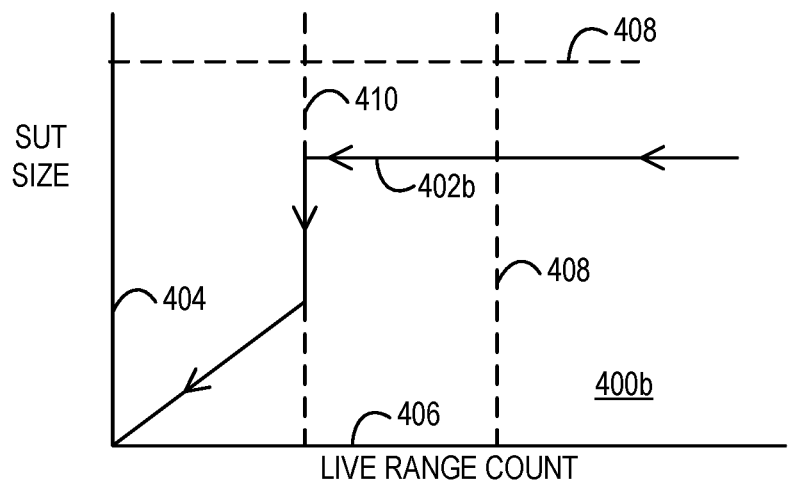
Figure 4:
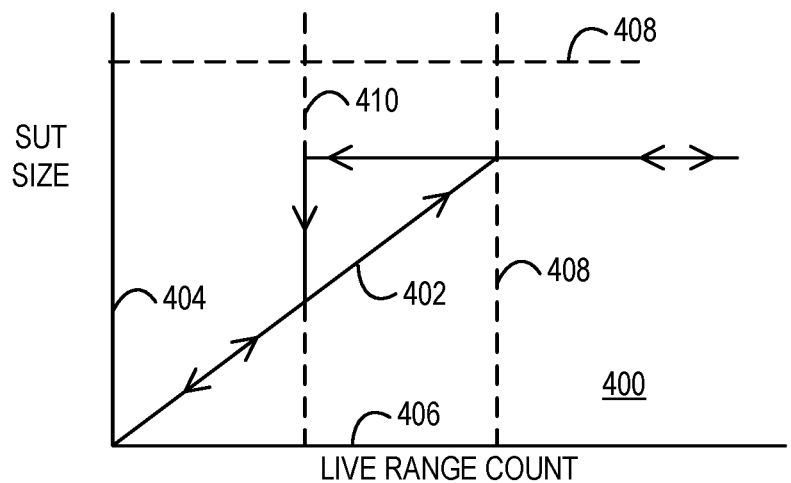

In this list format, depicted in FIG. 3A, SUT 300 has 24 bits (13+11), which is 3 bytes with 4-bit bytes, for each live sector range and thus grows linearly with the count of live ranges indicated. This is depicted in FIG. 4, which shows the growth of SUT 300 relative to the count of live ranges with a SUT size curve 402a. Turning briefly to FIG. 4, SUT size curve 402a is plotted in a graph 400a with a SUT size axis 404 versus a live range count axis 406. As the count of live ranges increases (moving rightward on live range count axis 406), SUT size curve 402a increases linearly. However, when SUT size curve 402a grows too large, increasing above a bitmap-favored threshold 408, SUT 300 is changed (converted) to its bitmap format illustrated in FIG. 3B. As indicated, bitmap-favored threshold 408 may be implemented for comparison with the size of SUT 300, or bitmap-favored threshold 408 may be implemented for comparison with the count of live ranges indicated by SUT 300. This is because the size of SUT 300 is a function of the count of live ranges indicated by SUT 300, when SUT 300 is in the list format.

Referring now specifically to FIG. 3B, SUT 300 has a bitmap 304 in its bitmap format form. Each live block is identified as shaded. In this format, the size of SUT 300 is fixed and independent of the count of live ranges. For example, with a log segment having up to 8192 blocks, if every second block is live, then bitmap 304 would have a checkerboard pattern. With 4-bit bytes, bitmap 304 may be represented by a 1 KB bitmap, making SUT 300 only 1 KB in its bitmap form. However, with this live block pattern, the list format would need to list 4096 different live blocks, and at 3 bytes each, list 302 would require 12 KB. Thus, the bitmap format form of SUT 300, shown in FIG. 3B, is more compact when the count of live ranges becomes sufficiently large.

Turning now back to FIG. 4, SUT size curve 402b is plotted in a graph 400b with SUT size axis 404 versus live range count axis 406. As the count of live ranges decreases (moving leftward on live range count axis 406), SUT size curve 402b remains fixed at the size of bitmap 304. However, when the count of live ranges becomes sufficiently small, decreasing below a list-favored threshold 410, SUT 300 is changed (converted) to its list format illustrated in FIG. 3A. As indicated, list-favored threshold 410 may be implemented for comparison with the count of live ranges indicated by SUT 300. This is because the size of SUT 300 is independent of the count of live ranges indicated by SUT 300, when SUT 300 is in the bitmap format.

In some examples, bitmap-favored threshold 408 and list-favored threshold 410 are set to trigger changing the format of SUT 300 at a fixed count of live ranges. Above that count, SUT 300 is in the bitmap format and below that count, SUT 300 is in the list format. However, in order to prevent rapid bouncing between the formats, when count of live ranges hovers near a common threshold value, bitmap-favored threshold 408 and list-favored threshold 410 may be separated to form a hysteresis curve 402, plotted in a graph 400.

According to hysteresis curve 402, with SUT 300 in its list format, as the count of live ranges grows, the size of SUT 300 also grows, until bitmap-favored threshold 408 is reached. SUT 300 is then converted to its bitmap format. While in its list format, SUT 300 is permitted to grow to the size it would take in its bitmap format. However, after conversion, as the count of live ranges then grows, the size of SUT 300 in its bitmap format remains fixed. As the count of live ranges then drops, the size of SUT 300 in its bitmap format remains fixed until list-favored threshold 410 is reached. SUT 300 is then converted to its list format. While in its bitmap format, SUT 300 is permitted to shrink somewhat below the size it would take in its list format, in order to prevent unnecessary conversion if SUT 300 were to grow again above list-favored threshold 410 without reaching list-favored threshold 410.

In general, the greater the separation between bitmap-favored threshold 408 and list-favored threshold 410, the less often SUT 300 will change between formats (e.g., be converted from one format to the other format). In some examples, a machine learning (ML) component (e.g., ML component 832 of FIG. 8) determines the amount of separation between bitmap-favored threshold 408 and list-favored threshold 410 using historical data, in order to balance the space savings with the burden of changing SUT 300 between the list format and the bitmap format.

FIG. 5 illustrates an exemplary data format that may be used to store chunks in the tiered data storage structure of FIG. 2. As illustrated, an original object 131 is separated into portion 501 and portion 502. Portion 501 is further separated into portion 503 and portion 504, and portion 502 is further separated into portion 505 and portion 506. Portions 503-

506 may each be chunks or sets of chunks (e.g., a set of 32 chunks). At a later time, original object 131 is changed into a modified object 131a. When generating a snapshot, the difference between original object 131 and modified object 131a is stored, rather than the entirety of modified object 131a. Modified object 131a is separated into portion 501 (unchanged, and thus common with original object 131) and portion 512. Portion 512 is further separated into portion 505 (unchanged, and thus common with original object 131) and portion 516. Portion 516 may be a chunk. Thus, for the later snapshot, only portion 516 requires storage, and modified object 131a may be restored at a later time using portions 503-505 and 516.

The storage of portion 516 within LFS 202, specifically within log segment 211 is shown. Portion 516 may be stored, for example as chunk 221 (see FIG. 2) if it is unique and not a duplicate of another prior-stored chunk. The storage uses the format of stored chunk 221 followed by metadata 522 as a block 520. In some examples, chunk 221 is 4 KB and metadata 522 is 512 bytes. In some examples, metadata 522 includes:

```
message DataBlock {
    int64 chunkID = 1; // Relative to previous chunkID + 1 (or 0 for first)
    int64 objectID = 2; // Relative to previous objectID
    int64 snapshotID = 3; // Relative to previous snapshotID
    int64 lba = 4; // Relative to previous LBA + 1
    bytes digestSha256 = 5; // SHA256 Digest of uncompressed unencrypted data
    int32 compression = 7; // Relative to previous compression
    int32 encryption = 8; // Relative to previous encryption
    int64 keyID = 9; // For key rotation support; relative to previous keyID
    bytes data = 15; // Format depends on compression and encryption
}
message DataSegment {
    repeated DataBlock blocks = 1;
    fixed32 crc32c = 2; // CRC32C of all parts of the DataSegment except crc32c itself
}
```

In some examples, the field default value is empty (or zero), and values for the fields are relative to previous instances of the fields. When consecutive blocks of data are stored, only digest and data have to be stored, as object/snapshot/encryption identification is inherited from the previous block, and logical block address (LBA) and chunkID are each increased by one.

In this illustrated example, block 520 comprises chunk 221 plus metadata 522. If block 520 is a live block during a segment cleaning operation, when log segment 211 becomes a segment cleaning candidate (and is listed in a list of candidate segments 152 of FIG. 1), block 520 will be coalesced with other live blocks in a different segment. When block 520 is read during such a segment cleaning operation, reading (live) block 520 includes reading a chunkID 524 in metadata 522, which is associated with (live) block 520. Reading other live blocks will also result in reading chunk identifiers (chunkIDs) associated with those live blocks. As chunkIDs are read, while reading block 520 (and other live blocks), the chunkIDs may be stored in remembered chunkIDs 154 for later use when advantageously performing a blind update of at least a portion of chunk map 254.

Figure 6:
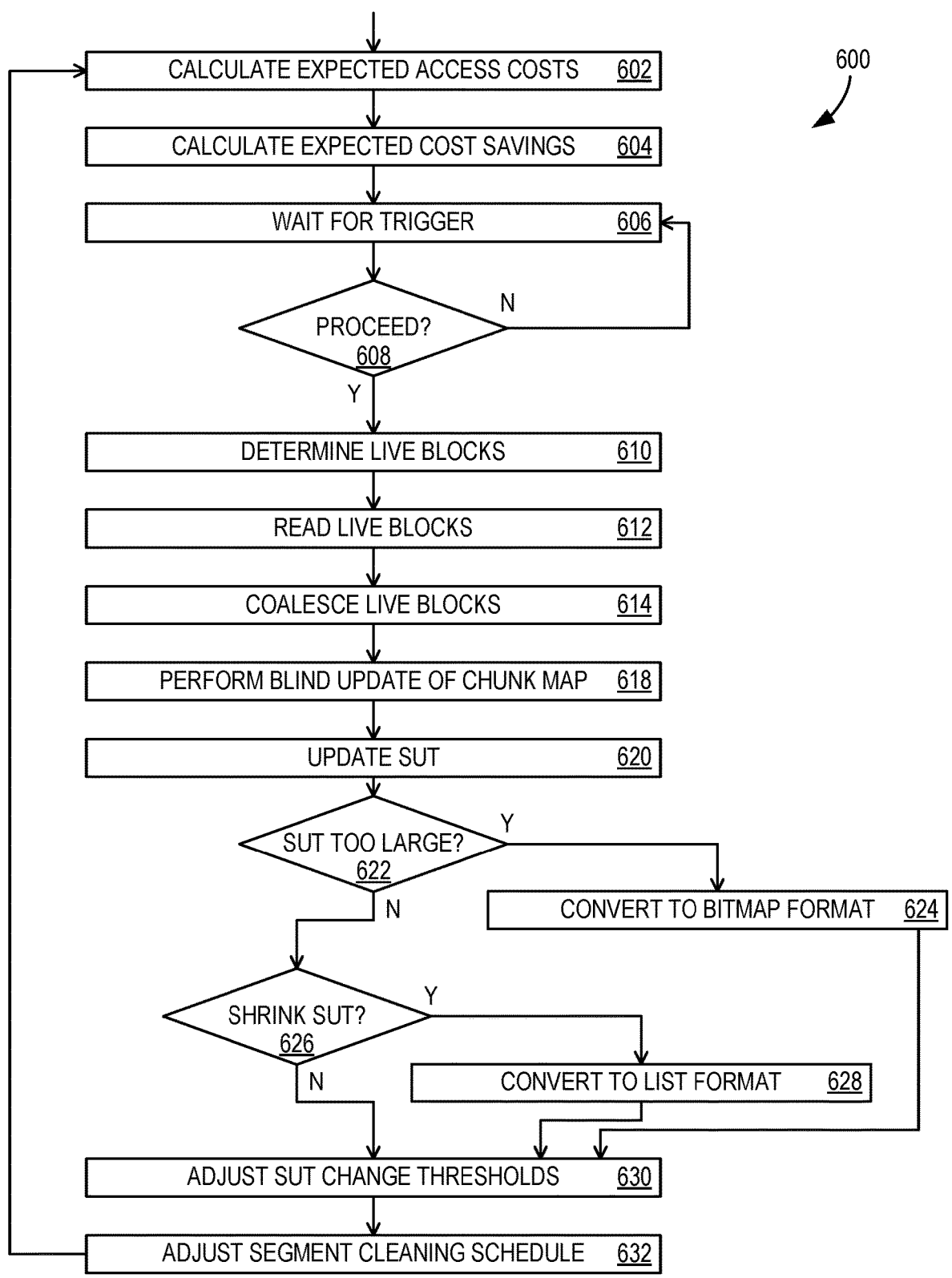
FIG. 6 illustrates a flow chart of exemplary operations associated with the architecture of FIG. 1.

FIG. 6 illustrates a flow chart 600 of exemplary operations associated with architecture 100, for example enhancing efficiency of segment cleaning for an LFS. In some examples, the operations of flow chart 600 are performed by one or more computing devices 800 of FIG. 8. Operation 602 includes, based at least on access costs, calculating an expected cost of a segment cleaning operation. Operation 604 includes, based at least on storage costs, calculating an expected cost savings from the segment cleaning. Flow chart 600 waits for a segment cleaning trigger at 606, which may be based on a segment cleaning schedule or a determination that LFS 202 is full to a threshold amount. Decision operation 608 includes, based at least on the expected cost of the segment cleaning and the expected cost savings from the segment cleaning, determining whether to perform the segment cleaning. Based at least on making a determination to perform the segment cleaning, flow chart 600 performs segment cleaning as operations described herein. The cleaning is a multi-stage process of updating chunk map 254 and updating SUT 300 after coalescing live blocks.

Operation 610 includes determining, based at least on SUT 300, live blocks (e.g., block 520 and others) in LFS 202, wherein the live blocks represent portions of stored objects (e.g., block 520 includes chunk 221, which represents a portion of modified object 131a). In some examples, the objects comprise VMDKs and/or snapshots of VMDKs. Operation 612 includes, reading the live blocks, wherein reading the live blocks includes reading chunkIDs (e.g., chunkID 524) associated with the live blocks. Operation 614 includes coalescing the live blocks, wherein the coalescing comprises writing at least a portion of the live blocks into at least one new segment (e.g., log segment 214).

Operation 618 includes advantageously performing a blind update of at least a portion of the chunkIDs in chunk map 254 to indicate the new segment, wherein performing a blind update comprises writing to chunk map 254 without reading from chunk map 254. In some examples, chunk map 254 is stored in LSM-tree 256. SUT 300 is updated in operation 620. In some examples, operation 620 may be performed prior to operation 618. Decision operation 622 includes determining whether SUT 300 has increased in size above bitmap-favored threshold 408. If so, operation 624 includes converting the format of SUT 300 from the list format to the bitmap format. Otherwise, decision operation 626 includes determining whether a count of live ranges in SUT 300 has decreased in size below list-favored threshold 410. If it has, operation 628 includes converting the format of SUT 300 from the bitmap format to the list format. Together, operations 622-628 comprise based at least on a change of size of SUT 300, changing a format of SUT 300 between a list format (including list 302) and a bitmap format (including bitmap 304). In some examples, operations 622-628 occur after the coalescing of operation 614.

In some example, list-favored threshold 410 is less than or equal to a count of live ranges corresponding to bitmap-favored threshold 408. In some examples, bitmap-favored threshold 408 indicates a count of live ranges that is greater than list-favored threshold 410 by some amount to create a hysteresis condition so that SUT 300 does not bounce unnecessarily between the two formats. Operation 630 includes optimizing a difference by which the count of live ranges corresponding to bitmap-favored threshold 408 is greater than list-favored threshold 410. This may include adjusting bitmap-favored threshold 408, adjusting list-favored threshold 410, or adjusting both. In some examples, ML component 832 (see FIG. 8) performs the optimization based at least on historical costs. Operation 632 includes optimizes a segment cleaning schedule, based at least on historical costs, for example, the schedule used in trigger operation 606. In some examples, operation 632 is performed by ML component 832.

Figure 7:
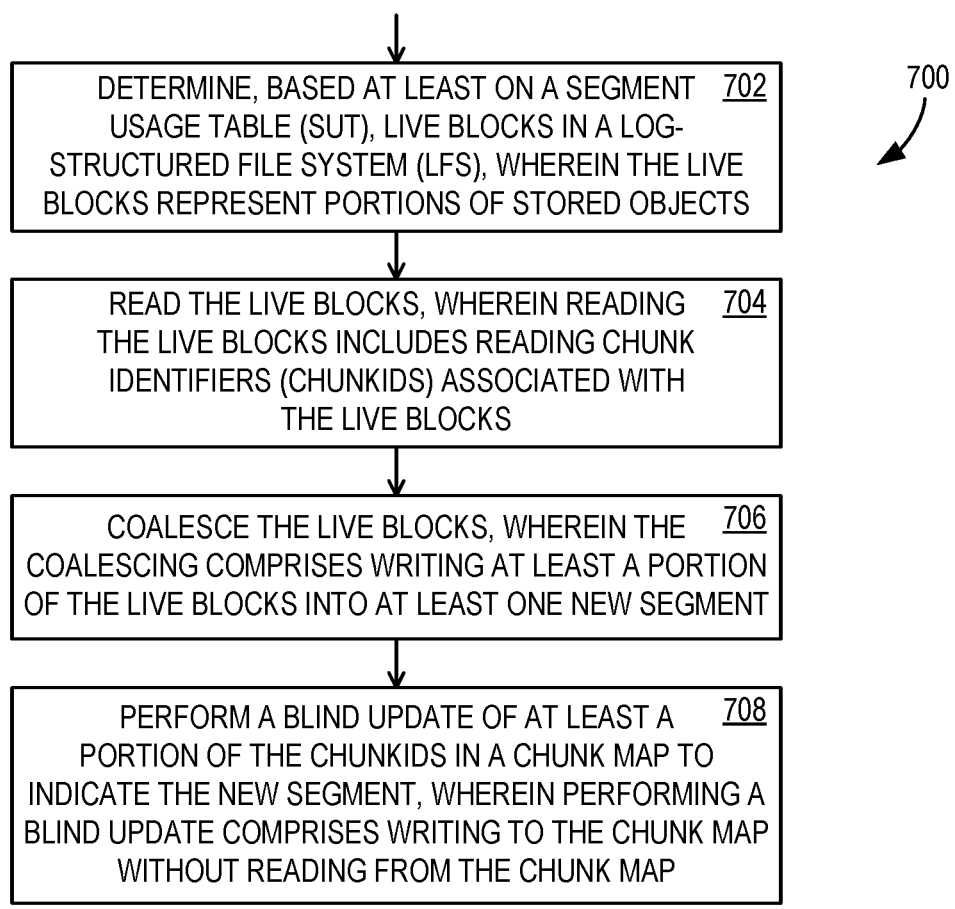
FIG. 7 illustrates another flow chart of exemplary operations associated with the architecture of FIG. 1.

FIG. 7 illustrates a flow chart 700 showing a method of enhancing efficiency of segment cleaning for an LFS. In some examples, the operations of flow chart 700 are performed by one or more computing devices 800 of FIG. 8. Operation 702 includes determining, based at least on an SUT, live blocks in an LFS, wherein the live blocks represent portions of stored objects. Operation 704 includes reading the live blocks, wherein reading the live blocks includes reading chunk identifiers (chunkIDs) associated with the live blocks. Operation 706 includes coalescing the live blocks, wherein the coalescing comprises writing at least a portion of the live blocks into at least one new segment. Operation 708 includes performing a blind update of at least a portion of the chunkIDs in a chunk map to indicate the new segment, wherein performing a blind update comprises writing to the chunk map without reading from the chunk map.

FIG. 8 illustrates a block diagram of computing device 800 that may be used within architecture 100 of FIG. 1. Computing device 800 has at least a processor 802 and a memory 804 (or memory area) that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid state drives (SSDs), non-volatile memory express (NVMe) devices, persistent memory (PMEM), quad-level cell (QLC) storage solutions, and/or optical disks. Program code 810 comprises computer executable instructions and computer executable components that embody methods and operations disclosed herein. Other logic and storage 830 that performs or facilitates other functions disclosed herein or otherwise required of computing device 800. For example, other logic and storage 830 may include machine learning (ML) and/or artificial intelligence (AI), together ML, capability in an ML component 832 that performs or optimizes processes described herein. A keyboard 842 and a computer monitor 844 are illustrated as exemplary portions of an I/O component 840, which may also or instead include a touchscreen, mouse, trackpad, and/or other I/O devices. A network interface 850 permits communication over a network 852 with a remote node 860, which may represent another implementation of computing device 800 or a cloud service.

Computing device 800 generally represents any device executing instructions (e.g., as application programs, operating system functionality, or both) to implement the operations and functionality described herein. Computing device 800 may include any portable or non-portable device including a mobile telephone, laptop, tablet, computing pad, netbook, gaming device, portable medium player, desktop personal computer, kiosk, embedded device, and/or tabletop device. Additionally, computing device 800 may represent a group of processing units or other computing devices, such as in a cloud computing system or service. Processor 802 may include any quantity of processing units and may be programmed to execute any components of program code 810 comprising computer executable instructions for implementing aspects of the disclosure. In some embodiments, processor 802 is programmed to execute instructions such as those illustrated in the figures.

Additional Examples

An exemplary computer system for enhancing efficiency of segment cleaning for an LFS comprises: a processor; and a non-transitory computer readable medium having stored thereon program code for transferring data to another computer system, the program code causing the processor to: determine, based at least on a SUT, live blocks in an LFS, wherein the live blocks represent portions of stored objects; read the live blocks, wherein reading the live blocks includes reading chunk identifiers (chunkIDs) associated with the live blocks; coalesce the live blocks, wherein the coalescing comprises writing at least a portion of the live blocks into at least one new segment; and perform a blind update of at least a portion of the chunk identifiers in a chunk map to indicate the new segment, wherein performing a blind update comprises writing to the chunk map without reading from the chunk map.

An exemplary method of enhancing efficiency of segment cleaning for an LFS comprises: determining, based at least on a SUT, live blocks in an LFS, wherein the live blocks represent portions of stored objects; reading the live blocks, wherein reading the live blocks includes reading chunk identifiers (chunkIDs) associated with the live blocks; coalescing the live blocks, wherein the coalescing comprises writing at least a portion of the live blocks into at least one new segment; and performing a blind update of at least a portion of the chunk identifiers in a chunk map to indicate the new segment, wherein performing a blind update comprises writing to the chunk map without reading from the chunk map.

An exemplary non-transitory computer readable storage medium has stored thereon program code executable by a processor, the program code embodying a method comprising: determining, based at least on a SUT, live blocks in an LFS, wherein the live blocks represent portions of stored objects; reading the live blocks, wherein reading the live blocks includes reading chunk identifiers (chunkIDs) associated with the live blocks; coalescing the live blocks, wherein the coalescing comprises writing at least a portion of the live blocks into at least one new segment; and performing a blind update of at least a portion of the chunk identifiers in a chunk map to indicate the new segment, wherein performing a blind update comprises writing to the chunk map without reading from the chunk map.

Alternatively, or in addition to the other examples described herein, examples include any combination of the following:

- based at least on a change of size of the SUT, changing a format of the SUT between a list format and a bitmap format;
- changing the format of the SUT comprises, after the coalescing, determining that the SUT has increased in size above a bitmap-favored threshold and converting the format of the SUT from the list format to the bitmap format;
- changing the format of the SUT comprises, after the coalescing, determining that a count of live ranges in the SUT has decreased in size below a list-favored threshold and converting the format of the SUT from the bitmap format to the list format;
- the list-favored threshold is less than or equal to a count of live ranges corresponding to the bitmap-favored threshold;
- the bitmap-favored threshold indicates a count of live ranges that is greater than the list-favored threshold;
- an ML component optimizes a difference by which the bitmap-favored threshold is greater than the list-favored threshold, based at least on historical costs;
- based at least on access costs, calculating an expected cost of a segment cleaning operation;

based at least on storage costs, calculating an expected cost savings from the segment cleaning;
based at least on the expected cost of the segment cleaning and the expected cost savings from the segment cleaning, determining whether to perform the segment cleaning;
based at least on making a determination to perform the segment cleaning, performing the segment cleaning;
an ML component optimizes a segment cleaning schedule, based at least on historical costs;
the chunk map is stored in an LSM-tree;
the objects comprise VMDKs;
updating indications of live blocks in the SUT during the coalescing;
the segment cleaning comprises: determining, based at least on numbers of live blocks indicated in the SUT, a plurality of segment cleaning candidates; and for each segment cleaning candidate of the plurality of segment cleaning candidates: determining whether a block in the segment cleaning candidate is live; based at least on the block not being live, marking the block as free; and based at least on the block being live, including the block in a coalescing operation; and
an ML component optimizes a segment cleaning schedule, based at least on historical costs.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements.

The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of enhancing efficiency of segment cleaning for a log-structured file system (LFS), the method comprising:
   using a segment usage table (SUT) that indicates space available in log segments of the LFS, identifying, by a processor, a plurality of log segments having contiguous sections that are candidates for segment cleaning;
   identifying, by the processor, live blocks within the plurality of the identified log segments, the identifying comprising determining offsets corresponding to locations in the LFS and determining corresponding lengths of the live blocks in each contiguous section of the contiguous sections in the LFS, the live blocks representing blocks that hold current data;
   reading, by the processor, the live blocks in the plurality of the identified log segments, each live block comprising a chunk holding data and an associated chunk identifier, wherein reading the live blocks includes reading data being held by the live blocks and chunk identifiers associated with the live blocks;
   coalescing, by the processor, the live blocks into a full segment, and writing the coalesced live blocks into one new segment;
   performing, by the processor, a blind update of the chunk identifiers in a chunk map to indicate the new segment, the updating comprising mapping the updated chunk identifiers to a segment identifier of the new segment, wherein performing a blind update comprises using the chunk identifiers extracted from the LFS to identify a location in the chunk map for performing the update and writing update data to the identified location in the chunk map without reading from the chunk map; and
   allowing the plurality of log segments to be over-written.

2. The method of claim 1, further comprising:
   while the SUT is in a list format, determining that a quantity of live blocks has reached a bitmap-favored threshold; and
   based on the determining, changing a format of the SUT from a list format to a bitmap format, and maintaining a constant size of the SUT.

3. The method of claim 2 further, comprising:
   after the coalescing, determining that the quantity of live blocks in the SUT has decreased to a list-favored threshold and converting the format of the SUT from the bitmap format to the list format, wherein the list-favored threshold is less than the quantity of live blocks corresponding to the bitmap-favored threshold.

4. The method of claim 1, further comprising:
   based at least on access costs, calculating an expected cost of a segment cleaning operation;
   based at least on storage costs, calculating an expected cost savings from the segment cleaning operation;
   based at least on the expected cost of the segment cleaning operation and the expected cost savings from the segment cleaning operation, determining whether to perform the segment cleaning operation; and
   based at least on making a determination to perform the segment cleaning operation, performing the segment cleaning operation.

5. The method of claim 1, wherein mapping the updated chunk identifiers to a segment identifier of the new segment comprises storing chunk identifiers and a segment identifier of the new segment as key-value pairs in a log-structured merge-tree (LSM-tree).

6. The method of claim 1, wherein allowing the plurality of log segments to be over-written comprises logically marking data in the log segments as deleted.

7. The method of claim 1, further comprising:
   updating indications of live blocks in the SUT during the coalescing.

8. A computer system for enhancing efficiency of segment cleaning for a log-structured file system (LFS) of a computer storage of the computer system, the computer system comprising:
   a processor; and
   a non-transitory computer readable medium having stored thereon program code for transferring data to another computer system, the program code causing the processor to:
   using a segment usage table (SUT) that indicates space available in log segments of the LFS, identify a plurality of log segments having contiguous sections that are candidates for segment cleaning;
   identify live blocks within the plurality of the identified log segments, the identifying comprising determining offsets corresponding to locations in the LFS and determining corresponding lengths of the live blocks in each contiguous section of the contiguous sections in the LFS, the live blocks representing blocks that hold current data;
   read the live blocks in the plurality of the identified log segments, each live block comprising a chunk holding data and an associated chunk identifier, wherein reading the live blocks includes reading data being held by the live blocks and chunk identifiers associated with the live blocks;
   coalesce the live blocks into a full segment, and write the coalesced live blocks into one new segment;
   perform a blind update of the chunk identifiers in a chunk map to indicate the new segment, the updating comprising mapping the updated chunk identifiers to a segment identifier of the new segment, wherein performing a blind update comprises using the chunk identifiers extracted from the LFS to identify a location in the chunk map for performing the update and writing update data to the identified location in the chunk map without reading from the chunk map; and
   allow the plurality of log segments to be over-written.

9. The computer system of claim 8, wherein the program code is further operative to:
   while the SUT is in a list format, determine that a quantity of live blocks has reached a bitmap-favored threshold; and
   based on the determining, change a format of the SUT from a list format to a bitmap format, and maintain a constant size of the SUT.

10. The computer system of claim 9, wherein, the program code is further operative to:

after the coalescing, determine that the quantity of live blocks in the SUT has decreased to a list-favored threshold and convert the format of the SUT from the bitmap format to the list format, wherein the list-favored threshold is less than the quantity of live blocks corresponding to the bitmap-favored threshold.

11. The computer system of claim 8, wherein the program code is further operative to:
based at least on access costs, calculate an expected cost of a segment cleaning operation;
based at least on storage costs, calculate an expected cost savings from the segment cleaning operation;
based at least on the expected cost of the segment cleaning operation and the expected cost savings from the segment cleaning operation, determine whether to perform the segment cleaning operation; and
based at least on making a determination to perform the segment cleaning operation, perform the segment cleaning operation.

12. The computer system of claim 8, wherein mapping the updated chunk identifiers to a segment identifier of the new segment comprises storing chunk identifiers and a segment identifier of the new segment as key-value pairs in a log-structured merge-tree (LSM-tree).

13. The computer system of claim 8, wherein allowing the plurality of log segments to be over-written comprises logically marking data in the log segments as deleted.

14. The computer system of claim 8, wherein the program code is further operative to:
update indications of live blocks in the SUT during the coalescing.

15. A non-transitory computer readable storage medium having stored thereon program code executable by a processor, the program code embodying a method for enhancing efficiency of segment cleaning of a log-structured file system (LFS) of a computer storage of a computer system, the method comprising:
using a segment usage table (SUT) that indicates space available in log segments of the LFS, identifying a plurality of log segments having contiguous sections that are candidates for segment cleaning;
identifying live blocks within the plurality of the identified log segments, the identifying comprising determining offsets corresponding to locations in the LFS and determining corresponding lengths of the live blocks in each contiguous section of the contiguous sections in the LFS, the live blocks representing blocks that hold current data;
reading the live blocks in the plurality of the identified log segments, each live block comprising a chunk holding data and an associated chunk identifier, wherein reading the live blocks includes reading data being held by the live blocks and chunk identifiers associated with the live blocks;
coalescing the live blocks into a full segment, and writing the coalesced live blocks into one new segment;
performing a blind update of the chunk identifiers in a chunk map to indicate the new segment, the updating comprising mapping the updated chunk identifiers to a segment identifier of the new segment, wherein performing a blind update comprises using the chunk identifiers extracted from the LFS to identify a location in the chunk map for performing the update and writing update data to the identified location in the chunk map without reading from the chunk map; and
allowing the plurality of log segments to be over-written.

16. The non-transitory computer readable storage medium of claim 15, wherein the program code further comprises:
while the SUT is in a list format, determining that a quantity of live blocks has reached a bitmap-favored threshold; and
based on the determining, changing a format of the SUT from a list format to a bitmap format, and maintaining a constant size of the SUT.

17. The non-transitory computer readable storage medium of claim 16, wherein, the program code further comprises:
after the coalescing, determining that the quantity of live blocks in the SUT has decreased to a list-favored threshold and converting the format of the SUT from the bitmap format to the list format, wherein the list-favored threshold is less than the quantity of live blocks corresponding to the bitmap-favored threshold.

18. The non-transitory computer readable storage medium of claim 15, wherein the program code further comprises:
based at least on access costs, calculating an expected cost of a segment cleaning operation;
based at least on storage costs, calculating an expected cost savings from the segment cleaning operation;
based at least on the expected cost of the segment cleaning operation and the expected cost savings from the segment cleaning operation, determining whether to perform the segment cleaning operation; and
based at least on making a determination to perform the segment cleaning operation, performing the segment cleaning operation.

19. The non-transitory computer readable storage medium of claim 15, wherein mapping the updated chunk identifiers to a segment identifier of the new segment comprises storing chunk identifiers and a segment identifier of the new segment as key-value pairs in a log-structured merge-tree (LSM-tree).

20. The non-transitory computer readable storage medium of claim 15, wherein allowing the plurality of log segments to be over-written comprises logically marking data in the log segments as deleted.

* * * * *